(12) United States Patent
Honda et al.

(10) Patent No.: US 11,869,335 B2
(45) Date of Patent: Jan. 9, 2024

(54) ALARM MANAGEMENT APPARATUS, ALARM MANAGEMENT SYSTEM, AND ALARM MANAGEMENT METHOD

(71) Applicant: Yokogawa Electric Corporation, Musashino (JP)

(72) Inventors: Kengo Honda, Musashino (JP); Yusuke Ono, Musashino (JP); Naoki Okubo, Musashino (JP); Motoichi Kuwatani, Musashino (JP)

(73) Assignee: Yokogawa Electric Corporation, Musashino (JP)

( * ) Notice: Subject to any disclaimer, the term of this patent is extended or adjusted under 35 U.S.C. 154(b) by 0 days.

(21) Appl. No.: 16/986,521

(22) Filed: Aug. 6, 2020

(65) Prior Publication Data

US 2021/0043062 A1 Feb. 11, 2021

(30) Foreign Application Priority Data

Aug. 8, 2019 (JP) .................. 2019-146753

(51) Int. Cl.
G08B 25/00 (2006.01)
G08B 25/14 (2006.01)

(52) U.S. Cl.
CPC .......... *G08B 25/001* (2013.01); *G08B 25/14* (2013.01)

(58) Field of Classification Search
CPC .................. G08B 25/001; G08B 25/14; G05B 2219/24123; G05B 23/0272; G05B 23/027; G05B 19/418
See application file for complete search history.

(56) References Cited

U.S. PATENT DOCUMENTS

| 6,774,786 B1* | 8/2004 | Havekost ........... G05B 23/0272 |
| | | 700/83 |
| 7,876,211 B2 | 1/2011 | Granatelli et al. |
| 8,166,352 B2 | 4/2012 | Harnois |
| 9,633,552 B2* | 4/2017 | Janchookiat ........... G08B 29/02 |
| 9,697,722 B2* | 7/2017 | Janchookiat ........ H04L 41/0609 |
| 2010/0019894 A1* | 1/2010 | Okada ................ G05B 23/0272 |
| | | 340/506 |
| 2017/0345287 A1* | 11/2017 | Fuller ................ G05B 23/0213 |
| 2019/0114897 A1* | 4/2019 | Tappan ............... G06F 11/3058 |

FOREIGN PATENT DOCUMENTS

| JP | 5-108412 A | 4/1993 |
| JP | 9-91572 A | 4/1997 |
| JP | 2001-195124 A | 7/2001 |
| JP | 2001195124 A * | 7/2001 |
| JP | 2004-86338 A | 3/2004 |
| JP | 2010-033118 A | 2/2010 |
| JP | 2017-097690 A | 6/2017 |
| JP | 2018-120456 A | 8/2018 |
| WO | 2014/129983 A1 | 8/2014 |

* cited by examiner

Primary Examiner — Quan Zhen Wang
Assistant Examiner — Rajsheed O Black-Childress
(74) Attorney, Agent, or Firm — Sughrue Mion, PLLC (57) ABSTRACT

An alarm management apparatus of the present disclosure presents a trigger alarm, which should be presented to an operator, to the operator when the trigger alarm is included in an alarm that is received or generated. The alarm management apparatus stores a suppressed alarm related to the trigger alarm, without presenting the suppressed alarm to the operator, when the suppressed alarm is included in the alarm and presents the stored suppressed alarm to the operator based on an operation by the operator.

20 Claims, 10 Drawing Sheets

ALARM MANAGEMENT APPARATUS, ALARM MANAGEMENT SYSTEM, AND ALARM MANAGEMENT METHOD

CROSS-REFERENCE TO RELATED APPLICATION

The present application claims priority to and the benefit of Japanese Patent Application No. 2019-146753 filed Aug. 8, 2019, the entire contents of which are incorporated herein by reference.

TECHNICAL FIELD

The present disclosure relates to an alarm management apparatus, an alarm management system, and an alarm management method.

BACKGROUND

When a piece of equipment is in an abnormal state due to process modulation or device failure in a plant or the like where a distributed control system (DCS) is used, this abnormality may trigger a secondary process abnormality in another piece of equipment. The occurrence of a process abnormality upstream, for example, may cause a process abnormality to occur downstream as well. If all of the alarms indicating abnormalities are displayed on the monitoring screen of an operator in this case, the monitoring screen becomes covered in alarms (alarm flood), confusing the operator. One approach to address this issue could be to present the operator with only the alarm indicating the original cause of the abnormality (trigger alarm), without presenting the alarms indicating secondary process abnormalities.

Patent literature (PTL) 1 proposes designating only the trigger alarm that indicates the original cause of the abnormality as the monitoring target of the operator and removing other alarms from the monitoring target of the operator. This prevents the operator from overlooking important alarms.

CITATION LIST

Patent Literature

PTL 1: JP2010-33118A

SUMMARY

An alarm management apparatus according to an embodiment presents a trigger alarm, which should be presented to an operator, to the operator when the trigger alarm is included in an alarm that is received or generated, stores a suppressed alarm related to the trigger alarm, without presenting the suppressed alarm to the operator, when the suppressed alarm is included in the alarm, and presents the stored suppressed alarm to the operator based on an operation by the operator.

An alarm management system according to an embodiment includes the alarm management apparatus, an operation monitoring terminal, and an engineering terminal.

An alarm management method according to an embodiment includes presenting a trigger alarm to an operator when the trigger alarm is included in an alarm that is received or generated, storing a suppressed alarm related to the trigger alarm, without presenting the suppressed alarm to the operator, when the suppressed alarm is included in the alarm, and presenting the stored suppressed alarm to the operator based on an operation by the operator.

DETAILED DESCRIPTION

When the monitoring target of the operator is only the trigger alarm as in PTL 1, the operator performs an operation to recover from the abnormality based only on the trigger alarm. A recovery operation based only on the trigger alarm, however, might not resolve the abnormality. In other words, the information presented to the operator has room for improvement to increase the efficiency of operations by the operator to recover from an abnormality.

The present disclosure therefore aims to provide an alarm management apparatus, an alarm management system, and an alarm management method that can increase the efficiency of operations by the operator to recover from an abnormality.

An alarm management apparatus according to an embodiment presents a trigger alarm, which should be presented to an operator, to the operator when the trigger alarm is included in an alarm that is received or generated, stores a suppressed alarm related to the trigger alarm, without presenting the suppressed alarm to the operator, when the suppressed alarm is included in the alarm, and presents the stored suppressed alarm to the operator based on an operation by the operator.

In this way, the suppressed alarm is presented to the operator based on an operation by the operator, thereby increasing the efficiency of operations by the operator to recover from an abnormality.

In an embodiment, when the suppressed alarm is effective for resolving the trigger alarm, the suppressed alarm may be presented to the operator together with the trigger alarm without the operator performing an operation.

In this way, a suppressed alarm useful for resolving the trigger alarm is presented to the operator together with the trigger alarm without the need for a call operation by the operator, thereby further increasing the efficiency of operations by the operator to recover from an abnormality.

In an embodiment, when the suppressed alarm is effective for resolving the trigger alarm, the suppressed alarm may be presented to the operator with greater emphasis than other suppressed alarms.

In this way, a suppressed alarm useful for resolving the trigger alarm is displayed with greater emphasis than other suppressed alarms, thereby further increasing the efficiency of operations by the operator to recover from an abnormality.

In an embodiment, the suppressed alarm effective for resolving the trigger alarm may be determined based on an operation history of the operator or a response from the operator.

In an embodiment, a learning unit configured to optimize a classification condition for classifying the alarm as the trigger alarm or the suppressed alarm based on an operation history of the operator may be further included.

Inclusion of the learning unit can further increase the efficiency of operations by the operator to recover from an abnormality.

An alarm management system according to an embodiment includes the alarm management apparatus, an operation monitoring terminal, and an engineering terminal.

In this way, the suppressed alarm is presented to the operator based on an operation by the operator, thereby increasing the efficiency of operations by the operator to recover from an abnormality.

An alarm management method according to an embodiment includes presenting a trigger alarm to an operator when the trigger alarm is included in an alarm that is received or generated, storing a suppressed alarm related to the trigger alarm, without presenting the suppressed alarm to the operator, when the suppressed alarm is included in the alarm, and presenting the stored suppressed alarm to the operator based on an operation by the operator.

In this way, the suppressed alarm is presented to the operator based on an operation by the operator, thereby increasing the efficiency of operations by the operator to recover from an abnormality.

The present disclosure can provide an alarm management apparatus, an alarm management system, and an alarm management method that can increase the efficiency of operations by the operator to recover from an abnormality.

Embodiments of the present disclosure are described below with reference to the drawings. Identical reference signs in the drawings indicate identical or equivalent constituent elements.

Figure 1:
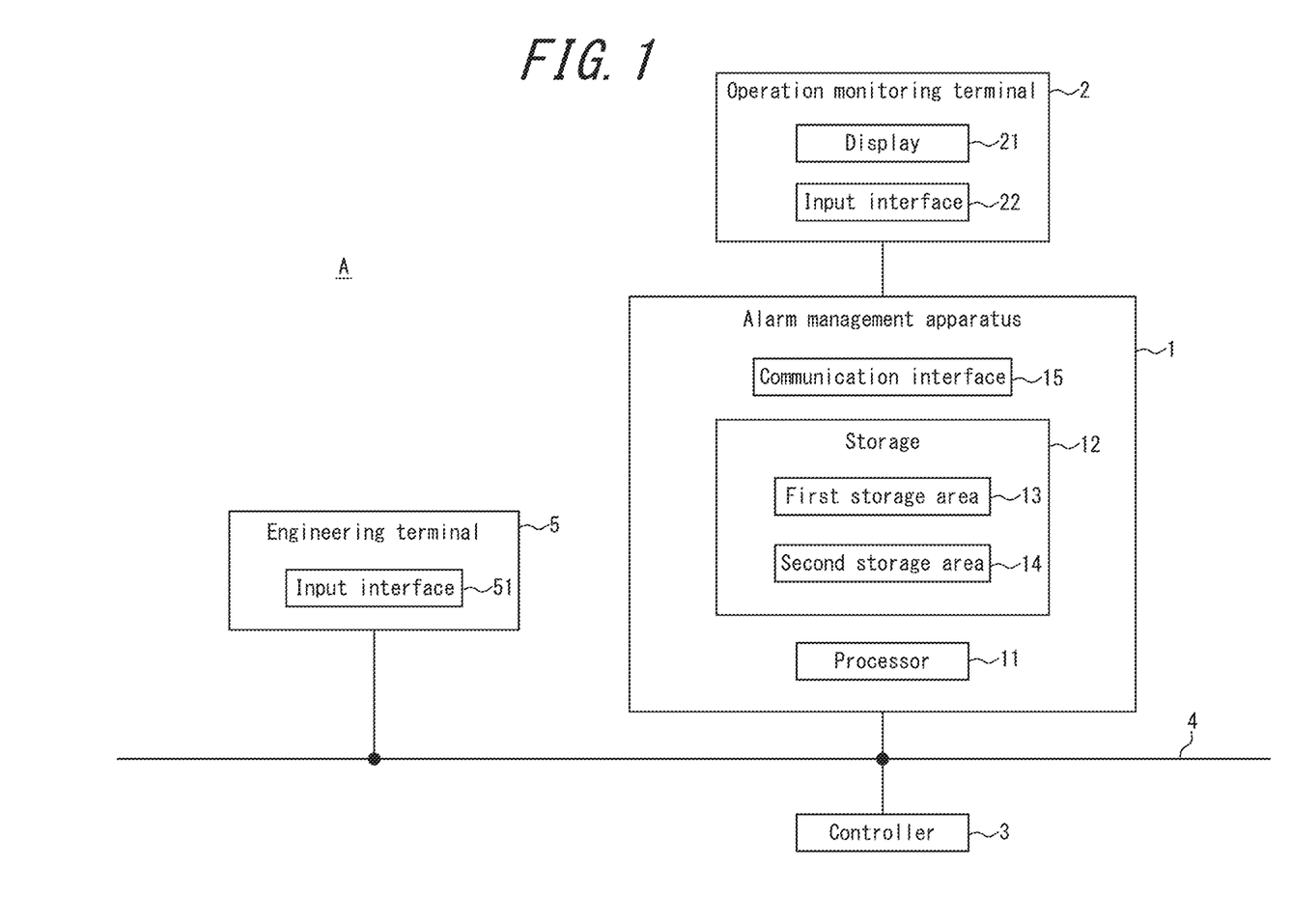
FIG. 1 illustrates the configuration of an alarm management apparatus according to an embodiment of the present disclosure.

As illustrated in FIG. 1, an alarm management apparatus 1 according to an embodiment of the present disclosure can perform data communication with an operation monitoring terminal 2, a controller 3, and an engineering terminal 5.

The operation monitoring terminal 2 may be any terminal capable of including a display 21 that displays the result of processing by the alarm management apparatus 1 and an input interface 22 capable of receiving operations by the operator. Examples of the operation monitoring terminal 2 include a desktop PC, a smartphone, and a tablet terminal.

The controller 3 is connected to field devices and the like and controls these devices. The controller 3 detects an abnormality from process modulation or a field device and transmits information based on the abnormality to the alarm management apparatus 1 via a control network 4.

When the controller 3 has a function to generate an alarm based on the above-described abnormality, the controller 3 may transmit the alarm generated by the controller 3 to the alarm management apparatus 1 via the control network 4.

Only one controller 3 is illustrated in FIG. 1, but more than one controller may be provided.

The engineering terminal 5 can include an input interface 51 capable of receiving an operation by an engineer. The engineer can use the input interface 51 to create a definition file, described below. The definition file created by the engineer is downloaded onto the alarm management apparatus 1 via the control network 4 and is used in the processing executed by the alarm management apparatus 1. Examples of the engineering terminal 5 include a desktop PC, a smartphone, and a tablet. The "definition file" is described below.

When a piece of equipment is in an abnormal state in a plant or the like due to process modulation or device failure, this abnormality may trigger a secondary process abnormality in another piece of equipment. The occurrence of a process abnormality upstream, for example, may cause a process abnormality to occur downstream as well. If all of the alarms indicating abnormalities are displayed on the monitoring screen of an operator in this case, the monitoring screen becomes covered in alarms (alarm flood), confusing the operator. One approach to address this issue has been to present the operator with only the alarm indicating the original cause of the abnormality (trigger alarm), without presenting the alarms indicating secondary process abnormalities. The operator can efficiently perform operations to recover from the process abnormality that caused the trigger alarm, however, when an alarm indicating a secondary process abnormality due to the process abnormality that caused the trigger alarm (i.e. a suppressed alarm not presented to the operator with a known technique) is also presented to the operator as necessary. In other words, associating the trigger alarm with a suppressed alarm enables the operator to perform operations efficiently to recover from the process abnormality that caused the trigger alarm. As an example of this association between then trigger alarm and the suppressed alarm, an engineer can use the engineering terminal 5 to create a definition file for associating the trigger alarm and the suppressed alarm. The definition file contains a description of a trigger alarm, a suppressed alarm that occurs consequently with the process abnormality that caused the trigger alarm, and an alarm group to which the trigger alarm and the suppressed alarm belong.

The alarm management apparatus 1 may include a processor 11, a storage 12, and a communication interface 15. The components of the alarm management apparatus 1 are described below in detail.

The storage 12 may include a first storage area 13 and a second storage area 14. The storage 12 can be implemented using a semiconductor memory, a magnetic memory, or an optical memory, for example. Examples of the storage 12 include read only memory (ROM), flash memory, and dynamic random access memory (DRAM), which is capable of temporarily storing data. The number of storages 12 is not limited to one, and the first storage area 13 and the second storage area 14 may be located in different storages. The storage 12 may be an external storage apparatus that is attached to the alarm management apparatus 1.

When an abnormality occurs in a plant or the like, the processor 11 receives information based on the abnormality and generates an alarm. For example, the processor 11 can receive the information from the controller 3 via the control network 4 and the communication interface 15. The processor 11 can be implemented using one or a plurality of processors.

The processor 11 judges whether a trigger alarm is included in the generated alarm. To make this judgment, the processor 11 can refer to the above-described definition file.

Figure 4:
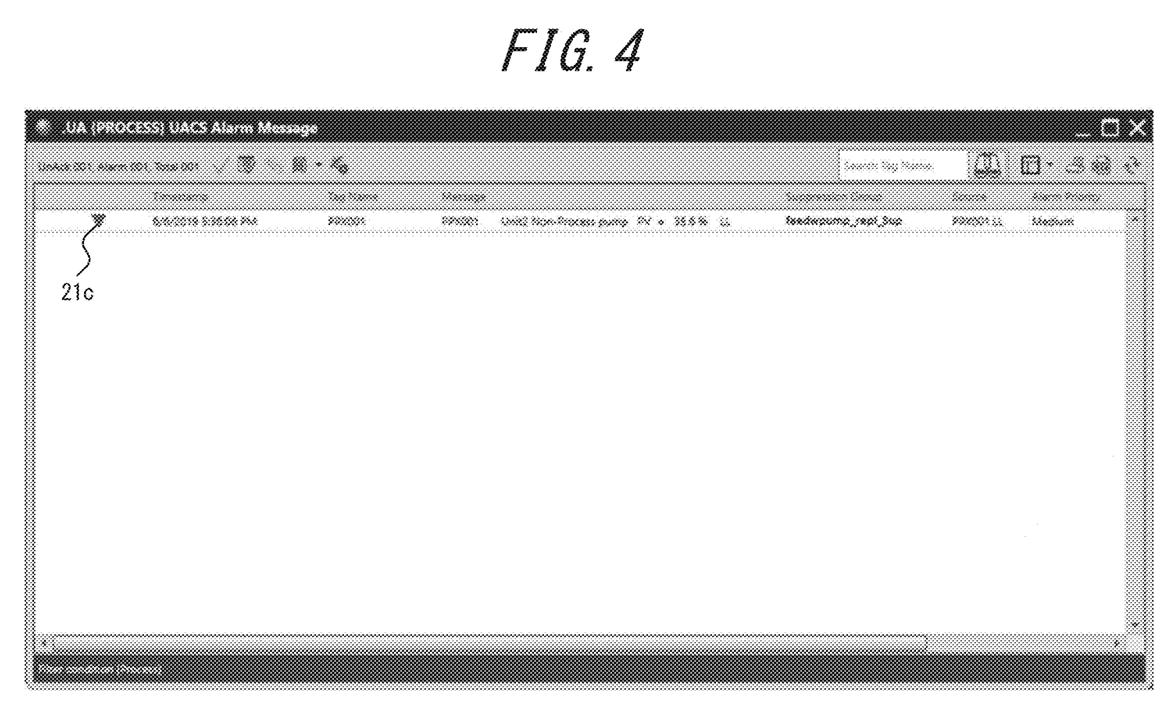
FIG. 4 illustrates a presentation example of step S101 of FIG. 2.
Figure 5:
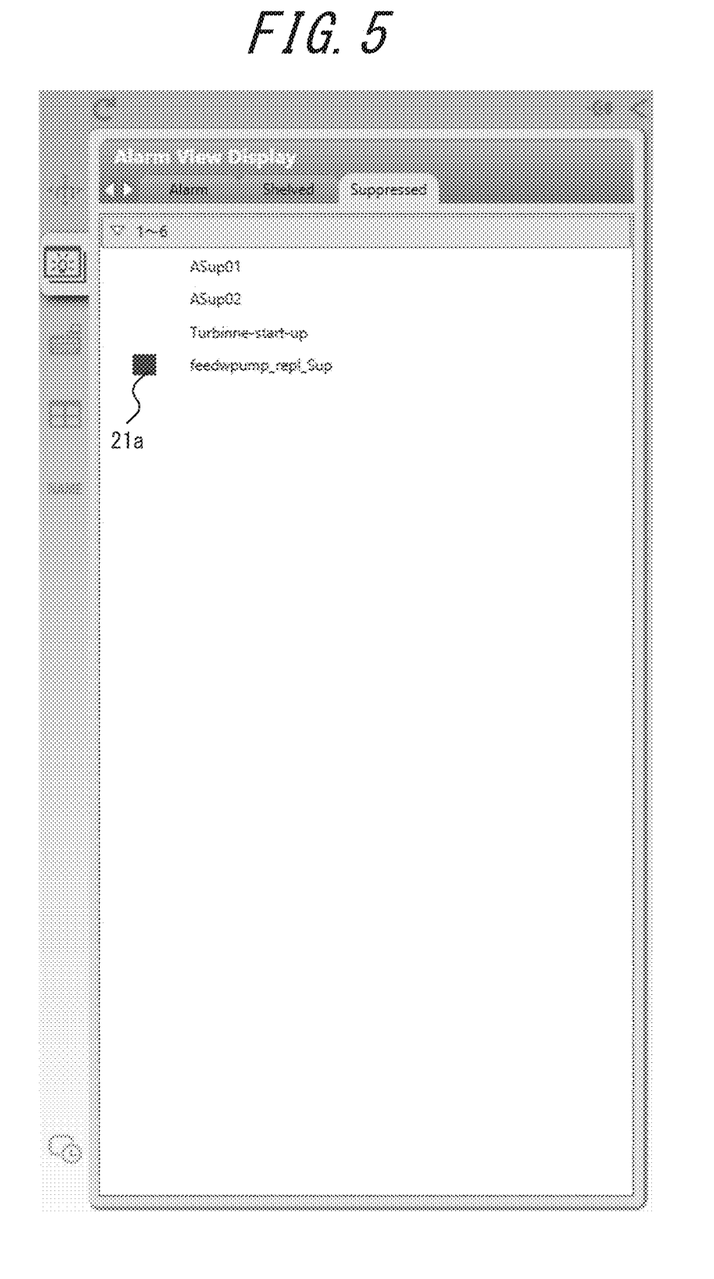
FIG. 5 illustrates a presentation example of step S101 of FIG. 2.
Figure 6:
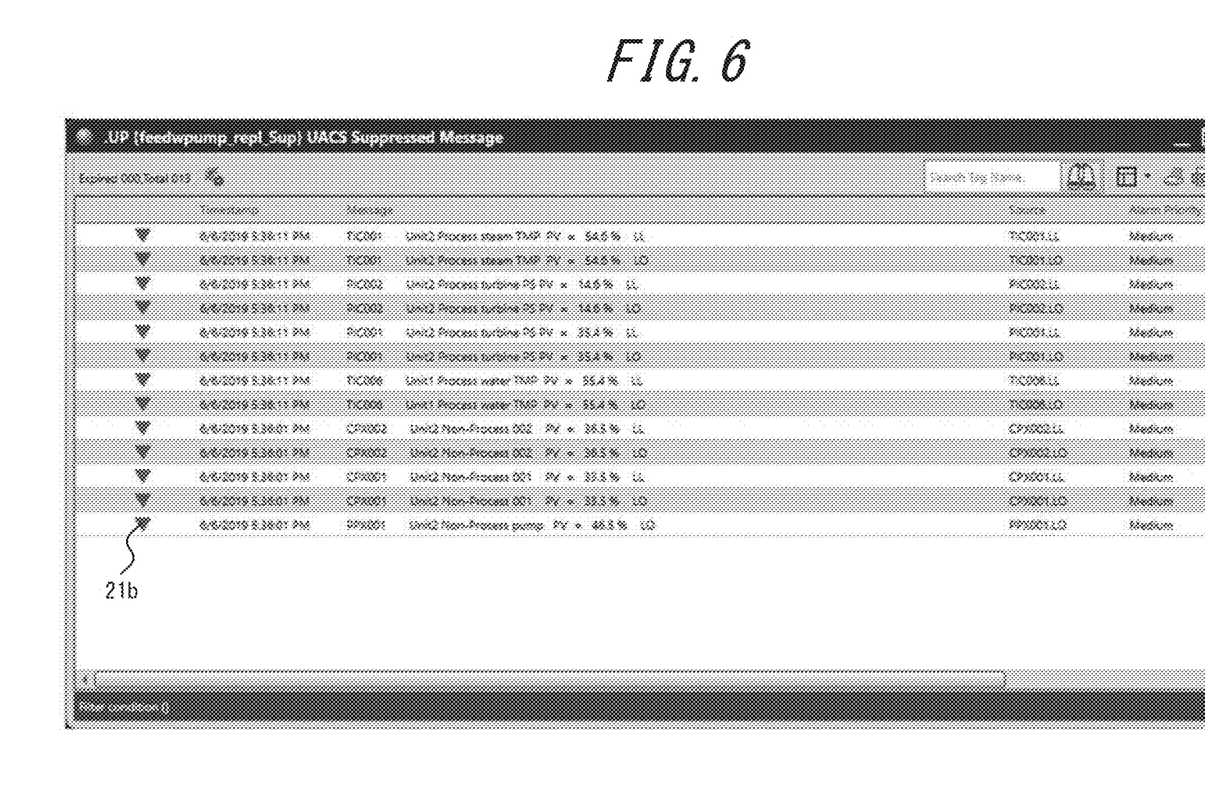
FIG. 6 illustrates a presentation example of step S104 of FIG. 2.

When a trigger alarm is included, the processor 11 presents the trigger alarm to the operator. For example, the processor 11 can display the trigger alarm on the display 21 of the operation monitoring terminal 2. FIG. 4 illustrates a window displayed on the display 21 of the operation monitoring terminal 2 when the trigger alarm is "PPX001.LL". The label "PPX001.LL" indicates that the state of an alarm occurring on the device with the tag name "PPX001" is LL (lower lower limit alarm). The processor 11 also presents the alarm group to which the trigger alarm belongs in a manner selectable by the operator. For example, the processor 11 can display the alarm group to which the trigger alarm belongs on the display 21 of the operation monitoring terminal 2 in a selectable manner. FIG. 5 illustrates a list of alarm groups in a window displayed on the display 21 of the operation monitoring terminal 2. While details are provided below, the operator can refer to the "Suppression Group" column displayed in the window of FIG. 4 to confirm the trigger alarm and the alarm group to which the trigger alarm belongs. The window of FIG. 6 is displayed when the operator clicks or the like to select the icon 21a displayed in the window of FIG. 5. Examples of the icon 21a include symbols, characters, numbers, graphics, or a combination thereof. The operator may, however, select the alarm group described above in the window of FIG. 4 without going through the window of FIG. 5.

The processor 11 can enter a standby state when a trigger alarm is not included in the generated alarm.

Furthermore, the processor 11 judges whether a suppressed alarm related to the above-described trigger alarm is included in the generated alarm. To make this judgment, the processor 11 can refer to the above-described definition file.

When a suppressed alarm related to the trigger alarm is included, the processor 11 stores the suppressed alarm in the storage 12, for example, without presenting the suppressed alarm to the operator. Based on an operation by the operator, the processor 11 presents the suppressed alarm s stored in the storage 12, for example, to the operator. In greater detail, the processor 11 associates the suppressed alarm with a predetermined alarm group based on the above-described definition file and stores the result in the second storage area 14, for example. The operator then refers to the window of FIG. 4 and the window of FIG. 5 to confirm a predetermined alarm group to which the trigger alarm belongs and selects the icon 21a displayed in the window of FIG. 5 by clicking or the like. Consequently, the processor 11 receives notification, via the communication interface 15, that the predetermined alarm group has been selected by the operator. The processor 11 then refers to the second storage area 14, for example, and presents the operator with the suppressed alarms belonging to the predetermined alarm group selected by the operator. Consequently, the window of FIG. 6, for example, is displayed on the display 21 of the operation monitoring terminal 2. FIG. 6 is a window indicating that the suppressed alarms belonging to the same alarm group (group name "feedwpump_repl_Sup") as the trigger alarm "PPX001.LL" are "TIC001.LL", "TIC.001.LO", "PIC002.LL", "PIC002.LO", "PIC001.LL", "PIC001.LO", "TIC006.LL", "TIC006.LO", "CPX002.LL", "CPX002.LO", "CPX001.LL", "CPX001.LO", and "PPX001.LO". Here, LO represents the state in which a lower limit alarm has occurred.

The processor 11 can enter the standby state when a suppressed alarm related to the trigger alarm is not included.

When the process value of a device exceeds a predetermined threshold, the processor 11 may judge that an alarm is to be presented to the operator. The operator can use the definition file to freely set the "predetermined threshold" for each trigger alarm and suppressed alarm.

The communication interface 15 may include one or a plurality of communication interfaces capable of communicating with each of the operation monitoring terminal 2, the controller 3, and the engineering terminal 5. The communication interface may be any communication interface capable of data communication in a wired or wireless manner.

FIRST PROCESSING EXAMPLE

Next, a first processing example that can be executed by the alarm management apparatus 1 according to the present embodiment is described with reference to FIG. 2.

Normally, the logic of the processor 11 is set so that operator is notified only of trigger alarms, whereas notification of suppressed alarms is suppressed automatically. This state is referred to below as the "alarm suppressed state". The alarm suppressed state is, for example, set as necessary by the operator operating a selection screen on the display 21 via the input interface 22 of the operation monitoring terminal 2. For example, via the window of FIG. 3 displayed on the display 21 of the operation monitoring terminal 2, the operator can set the suppressed alarms belonging to an alarm group (group name "feedwpump_repl_Sup") to the alarm suppressed state and can set the suppressed alarms belonging to other alarm groups (group names "ASup01", "ASup02", and "Turbinne-start-up") to an alarm non-suppressed state. The first processing example begins in FIG. 2 in this state.

In step S100, the processor 11 stores suppressed alarms belonging to alarm groups in the alarm suppressed state in the storage, without presenting these suppressed alarms to the operator.

Subsequently, in step S101, the processor 11 presents the trigger alarm to the operator. Here, the window of FIG. 5 was already being displayed on the display 21 of the operation monitoring terminal 2, and the window of FIG. 4 is additionally displayed separately from the window of FIG. 5 in step S101.

Subsequently, in step S102, the processor 11 presents the operator with the alarm group to which the trigger alarm presented to the operator in step S101 belongs. The alarm group is presented in a selectable manner.

Subsequently, in step S103, the operator selects the alarm group presented in a selectable manner in step S102. The operator can refer to the "Suppression Group" column displayed in the window of FIG. 4, confirm the predetermined alarm group to which the trigger alarm in step S101 belongs (here, the group name "feedwpump_repl_Sup"), and select the icon 21a in the window of FIG. 5 by clicking or the like to select the predetermined alarm group (here, the group name "feedwpump_repl_Sup"). When the alarm group is also displayed in the window of FIG. 4, the operator may select the alarm group (group name "feedwpump_repl_Sup") without passing through the window of FIG. 5.

Subsequently, in step S104, the processor 11 refers to the storage 12 and presents the suppressed alarms belonging to the alarm group selected in step S103 to the operator. In step S104, the window of FIG. 6 is additionally displayed on the display 21 of the operation monitoring terminal 2 separately from the window of FIG. 4 and the window of FIG. 5. In the window of FIG. 6, an icon 21b indicating an abnormality is displayed for each suppressed alarm.

Examples of the icon 21b include symbols, characters, numbers, graphics, or a combination thereof.

Subsequently, in step S105, the operator performs an operation to recover from the abnormality based on the trigger alarm presented in step S101 and the suppressed alarms presented in step S104.

Figure 7:
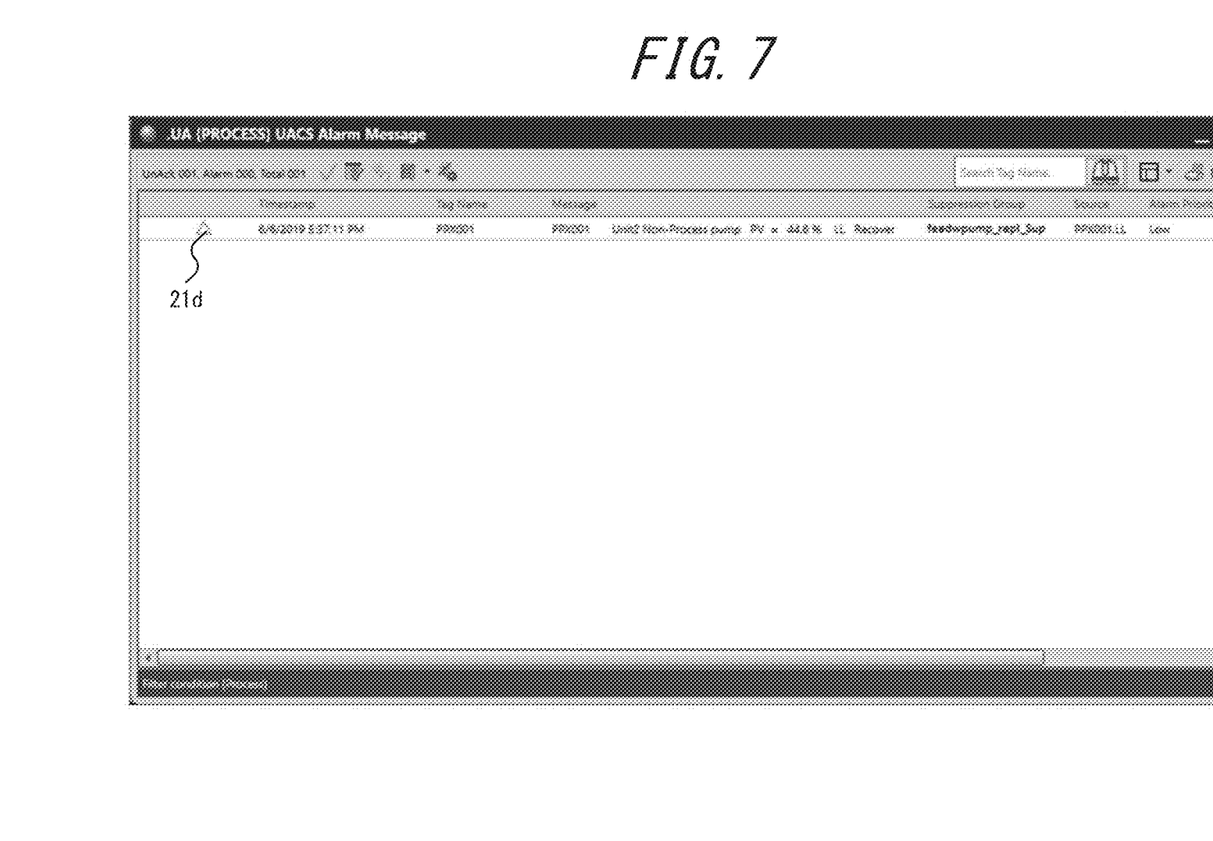
FIG. 7 illustrates a presentation example of step S106 of FIG. 2.

Here, when the abnormality is resolved by the recovery operation by the operator, the processor 11 can present a corresponding notification to the operator. For example, when the abnormality of the suppressed alarm "CPX002.LO" is resolved, the icon 21b displayed in the window of FIG. 6 to indicate the abnormality changes to an icon indicating a normal state. The icon 21c displayed in the window of FIG. 4 to indicate the abnormality changes to the icon 21d displayed in the window of FIG. 7 to indicate a normal state when the trigger alarm "PPX001.LL" related to the suppressed alarm "CPX002.LO" is also resolved. In other words, the window displayed on the display 21 of the operation monitoring terminal 2 changes from the "window of FIG. 4, window of FIG. 5, window of FIG. 6" to the "window of FIG. 7, window of FIG. 5, window of FIG. 6 (in which the icon 21b indicating an abnormality has changed to an icon indicating a normal state). The windows of FIGS. 6, 7 disappear from the display 21 of the operation monitoring terminal 2 in response to the operator performing an operation via the input interface 22 of the operation monitoring terminal 2. When a plurality of trigger alarms occur, however, the resolution of one trigger alarm does not necessarily resolve the other trigger alarms. The operator may therefore not always close the window of FIG. 7. Examples of the icons 21c, 21d include symbols, characters, numbers, graphics, or a combination thereof.

Subsequently, in step S106, the processor 11 judges whether the trigger alarm has been resolved by the recovery operation in step S105. When the trigger alarm has been resolved (step S106: YES), the present processing ends. When the trigger alarm has not been resolved (step S106: NO), the processing returns to step S104.

In the first processing example, the consequent suppressed alarms that are normally not presented to the operator to avoid an alarm flood are presented intentionally based on an operation by the operator. The number of alarms can therefore be reduced to prevent an important alarm from being overlooked while also enabling suppressed alarms, which are normally not presented, to be used effectively as auxiliary information for an operation to recover from an abnormality. Furthermore, the operator can confirm that recovery from the trigger alarm has also resolved all of the secondary process abnormalities that occurred. This can increase the efficiency of operations by the operator to recover from an abnormality.

SECOND PROCESSING EXAMPLE

Figure 8:
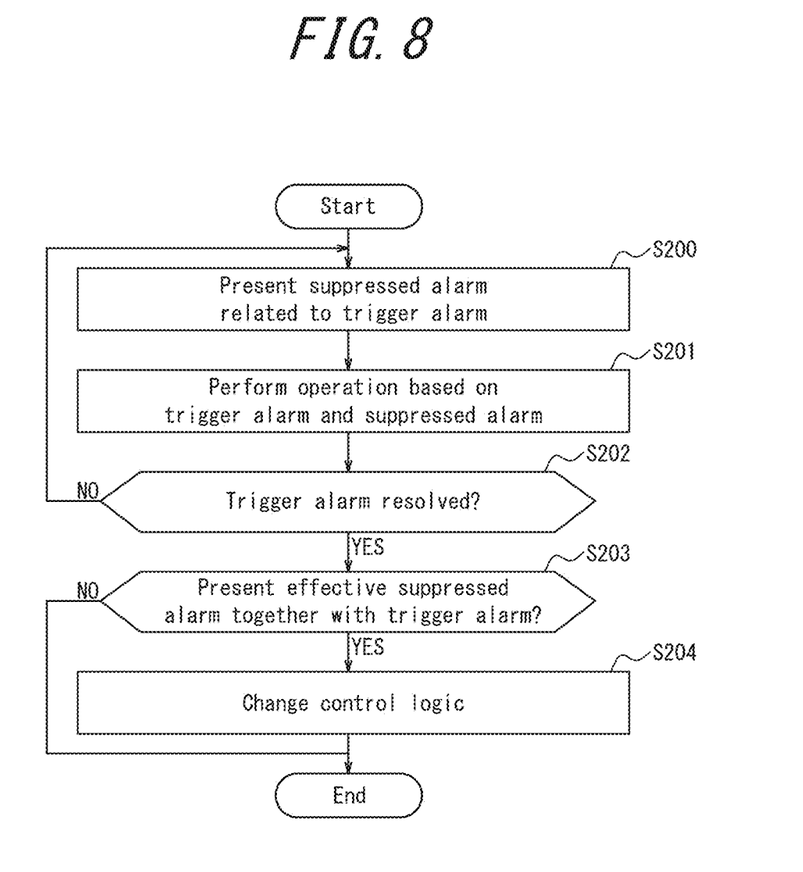
FIG. 8 is a flowchart illustrating a second processing example in the alarm management apparatus of FIG. 1.

Next, a second processing example that can be executed by the alarm management apparatus 1 according to the present embodiment is described with reference to FIG. 8.

The second processing example differs from the first processing example in that suppressed alarms effective for resolving the trigger alarm are presented to the operator along with the trigger alarm, without the operator performing an operation. The processor 11 performs similar processing to steps S100 to S103 of FIG. 2 in the second processing example as well. Among the processing included in the second processing example, FIG. 8 illustrates the processing from step S103 of FIG. 2 onwards.

In step S200, the processor 11 presents the consequent suppressed alarms to the operator, as in the first processing example.

Subsequently, in step S201, the operator performs an operation to recover from an abnormality based on the trigger alarm and the suppressed alarms, as in the first processing example.

In step S202, the processor 11 then judges whether the trigger alarm has been resolved by the recovery operation by the operator, as in the first processing example. When the trigger alarm has been resolved (step S202: YES), the processing proceeds to step S203. When the trigger alarm has not been resolved (step S202: NO), the processing returns to step S200.

In the case of proceeding to step S203, the processor 11 judges in this step whether to present suppressed alarms effective for resolving the trigger alarm subsequently to the operator. When the suppressed alarms are to be presented to the operator with the trigger alarm (step S203: YES), the processing proceeds to step S204. When the suppressed alarms are not to be presented to the operator with the trigger alarm (step S203: NO), the present processing ends.

For example, the processor 11 may judge in step S203 that the suppressed alarms are useful for resolving the trigger alarm when the number of times the trigger alarm is resolved as a result of the operator performing an operation to recover from the anomaly based on a particular suppressed alarm (i.e. the same suppressed alarm each time) exceeds a predetermined value. The operator can appropriately set the "predetermined value" using the input interface 51 of the engineering terminal 5. In other words, the suppressed alarm useful for resolving the trigger alarm can be determined based on the operation history of the operator. Alternatively, the processor 11 may present the operator with a dialog box or the like to ask whether a particular suppressed alarm is effective for resolving the trigger alarm. Based on the response inputted by the operator in the dialog box, the processor 11 may judge whether to present the suppressed alarm effective for resolving the trigger alarm to the operator. In other words, the suppressed alarm useful for resolving the trigger alarm can be determined based on a response from the operator.

In the case of proceeding to step S204, the processor 11 changes the control logic in this step so that the suppressed alarm that was effective for resolving the trigger alarm is subsequently presented to the operator together with the trigger alarm. The processor 11 then ends the present processing.

Figure 9:
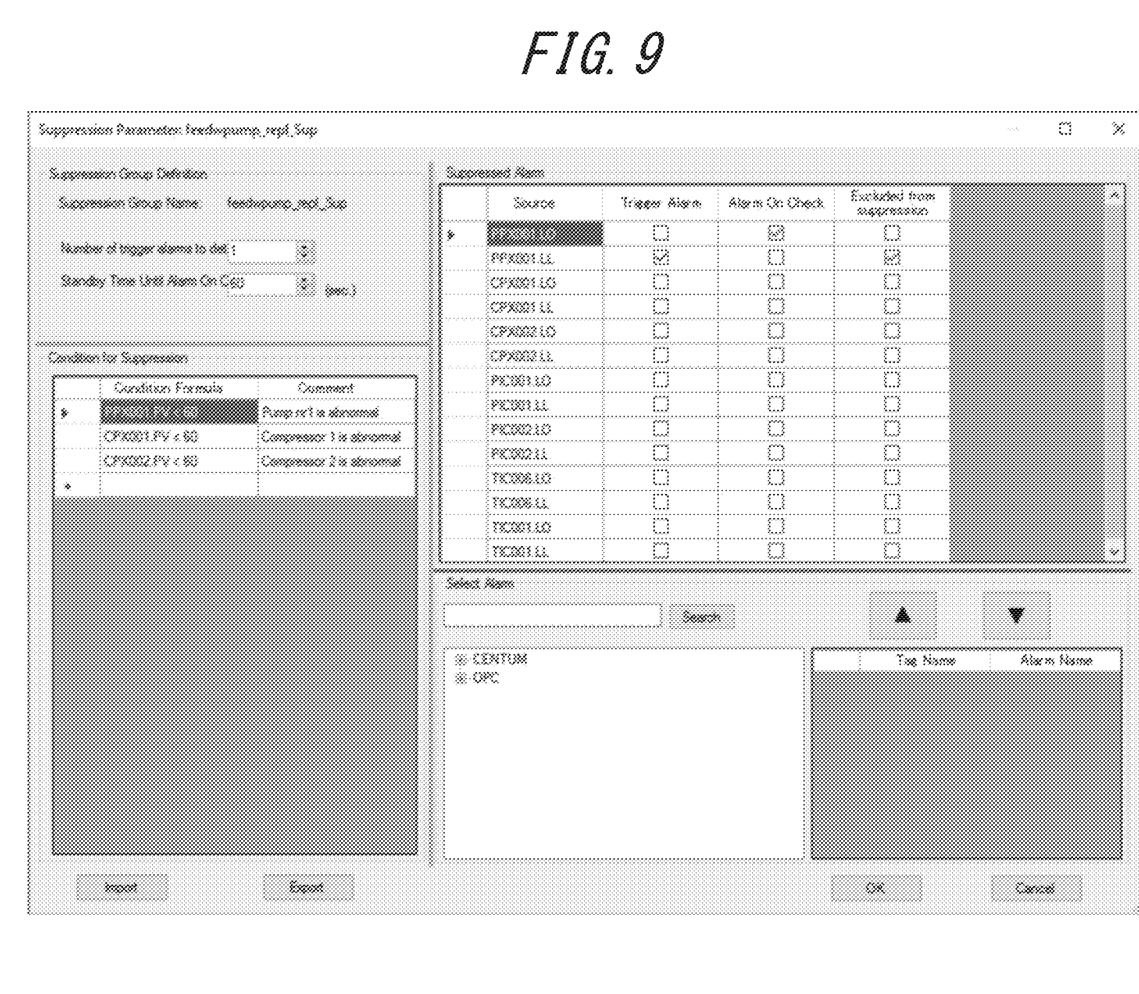
FIG. 9 illustrates an example of a definition file before the processing of step S204 of FIG. 8.
Figure 10:
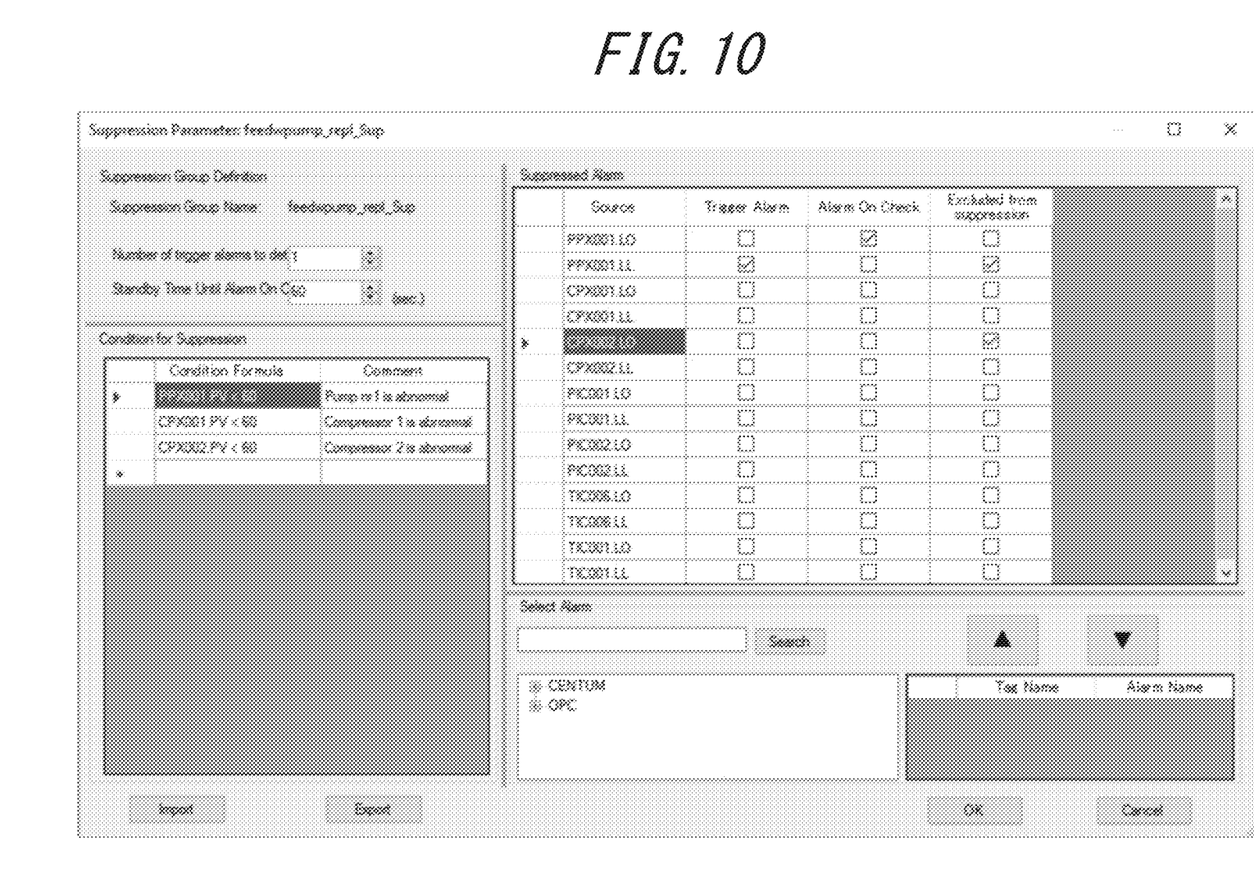
FIG. 10 illustrates an example of the definition file after the processing of step S204 of FIG. 8.

For example, the control logic may be changed in step S204 by updating the definition file as described below. FIG. 9 illustrates the content of the definition file before updating, whereas FIG. 10 illustrates the content of the definition file after updating. A comparison of FIG. 9 and FIG. 10 reveals that since the suppressed alarm "CPX002.LO" is effective for resolving the trigger alarm "PPX001.LL", the column "Excluded from suppression" is checked for the suppressed alarm "CPX002.LO" in FIG. 10. Consequently, the suppressed alarm "CPX002.LO" is subsequently displayed on the display 21 along with the trigger alarm. The consequent alarm "PPX001.LO" for which the column "Alarm On Check" is checked refers to how alarm suppression processing is continued if this alarm occurs within a predetermined time (such as within one minute) from the occurrence of the trigger alarm "PPX001.LL".

In this way, the suppression of a suppressed alarm useful for resolving the trigger alarm is suspended in the second processing example and is presented to the operator without the need for a call operation. In the first processing example, a suppressed alarm is presented to the operator as necessary based on an operation by the operator. In the second processing example, a suppressed alarm useful for resolving the trigger alarm is presented to the operator along with the trigger alarm without the operator performing an operation. The auxiliary information that the operator views can therefore be further optimized, which can further increase the efficiency of operations by the operator to recover from an abnormality.

The present disclosure has been explained based on drawings and embodiments, but it should be noted that a person of ordinary skill in the art could easily make a variety of modifications and adjustments on the basis of the present disclosure. Therefore, such changes and modifications are to be understood as included within the scope of the present disclosure. For example, the functions and the like included in the various steps and the like may be reordered in any logically consistent way. Furthermore, steps and the like may be combined into one or divided.

Figure 2:
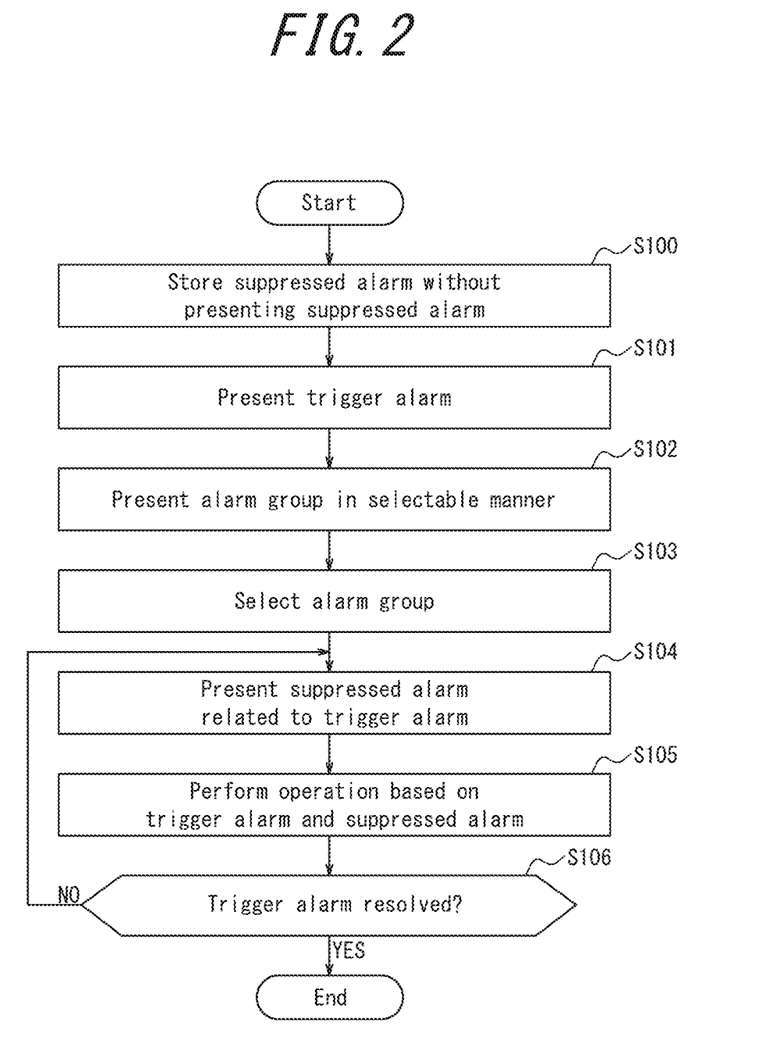
FIG. 2 is a flowchart illustrating a first processing example in the alarm management apparatus of FIG. 1.
Figure 3:
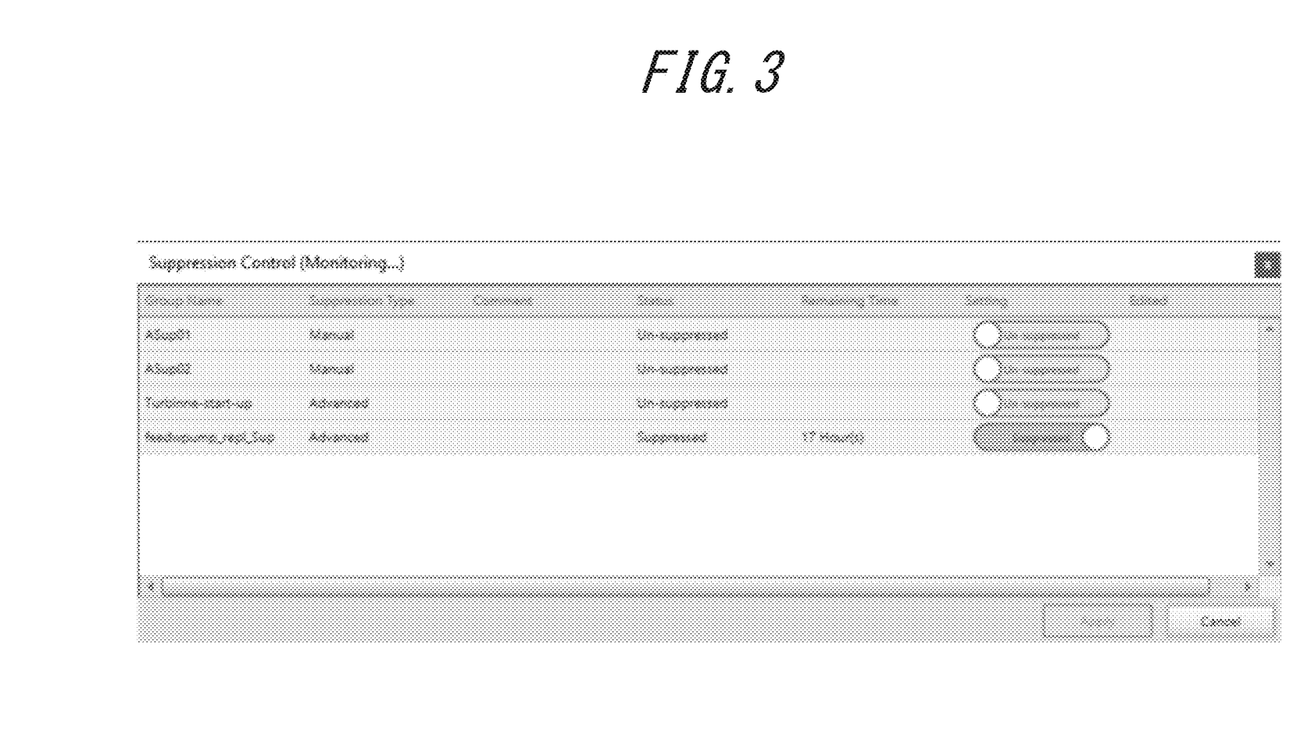
FIG. 3 illustrates a presentation example before step S100 of FIG. 2.

For example, the operator may, as necessary, perform an operation to recover from an abnormality based only on the trigger alarm between the processing of step S101 and the processing of step S102 in FIG. 2 in the above-described first processing example. The processor 11 may then perform the processing from step S102 onward when the abnormality is not resolved by this recovery operation.

In the above-described first processing example and second processing example, a suppressed alarm effective for resolving the trigger alarm may be presented to the operator with greater emphasis than the other suppressed alarms. For example, a suppressed alarm effective for resolving the trigger alarm may be displayed with greater emphasis than the other suppressed alarms in FIG. 6 by way of a mark, text that is colored or in bold, or the like. Furthermore, when a suppressed alarm effective for resolving the trigger alarm is displayed to the operator with greater emphasis than the other suppressed alarms in the first processing example, and the trigger alarm is resolved with a recovery operation by the operator based on the suppressed alarm, then the suppressed alarm may be presented to the operator together with the trigger alarm without the operator performing an operation, as in the second processing example. Specifically, a suppressed alarm effective for resolving the trigger alarm (such as "CPX002.LO") may be displayed with emphasis in the first processing example to enable the operator to notice the suppressed alarm "CPX002.LO" when opening the window of FIG. 6 and perform an operation to recover from the abnormality in light of the suppressed alarm ("CPX002.LO"). When the abnormality is resolved, the suppressed alarm ("CPX002.LO") may be displayed together with the trigger alarm ("PPX001.LL") without the operator performing an operation, as in the second processing example.

In the above embodiment, the operator sets the alarm classification condition. This condition may, however, be set using any type of machine learning, such as a neural network. The alarm management apparatus of the present disclosure may further include a learning unit. Based on the operation history of the operator, the learning unit optimizes the alarm classification condition so that the number of operations necessary for recovery from an abnormality decreases, for example. Subsequently, the learning unit transmits the optimized classification condition to the processor. The processor then updates the classification condition originally described in the definition file to the optimized classification condition. Alternatively, the processor may ask the operator whether to use the classification condition originally described in the definition file or the optimized classification condition. The processor judges whether to use the optimized classification condition based on the response from the operator. The learning unit can be implemented using one or more processors.

An alarm management system A may be configured to include the alarm management apparatus 1, the operation monitoring terminal 2, and the engineering terminal 5 according to the above embodiment.

INDUSTRIAL APPLICABILITY

The present disclosure can provide an alarm management apparatus, an alarm management system, and an alarm management method that can increase the efficiency of operations by the operator to recover from an abnormality.

The invention claimed is:
1. An alarm management apparatus comprising:
a storage; and
a processor configured to at least:
  present a trigger alarm indicating an original cause of an abnormality to an operator by an operation monitoring terminal when the trigger alarm is included in an alarm that is received or generated;
  store, in the storage, a suppressed alarm indicating a secondary process abnormality due to the process abnormality that caused the trigger alarm, without presenting the suppressed alarm to the operator, when the suppressed alarm is included in the alarm;
  additionally present the stored suppressed alarm to the operator based on an operation by the operator to the operation monitoring terminal,
  determine whether the suppressed alarm is effective for resolving the trigger alarm based on an operation history of a recovery operation by the operator or a response by the operator in a dialog box inquiring whether a particular suppressed alarm is effective for resolving the trigger alarm; and
  when the suppressed alarm is determined as effective for resolving the trigger alarm, change a control logic so that even when the suppressed alarm is included in the alarm, the suppressed alarm is subsequently presented to the operator together with the trigger alarm without the operator performing an operation to the operation monitoring terminal.

2. The alarm management apparatus of claim 1, wherein when the suppressed alarm is effective for resolving the trigger alarm, the alarm management apparatus is configured to present the suppressed alarm to the operator with greater emphasis than other suppressed alarms that are stored in the storage.

3. The alarm management apparatus of claim 1, further comprising a learning unit, implemented by one or more processors, configured to optimize a classification condition for classifying the alarm as the trigger alarm or the suppressed alarm based on the operation history of the operator.

4. The alarm management apparatus of claim 1, wherein the alarm management apparatus is communicatively connected to a control bus, and
  wherein the operation monitoring terminal and an engineering terminal are communicatively connected to the control bus.

5. The alarm management apparatus of claim 1, wherein the suppressed alarm is downstream of the trigger alarm.

6. The alarm management apparatus of claim 1, wherein the suppressed alarm is determined as effective when a number of times the trigger alarm was resolved by the suppressed alarm is greater than a threshold value.

7. The alarm management apparatus of claim 1, wherein the suppressed alarm is determined as effective based on an input from the operator to the dialog box indicating that the suppressed alarm is effective.

8. An alarm management method using an alarm management apparatus, the alarm management method comprising:
presenting a trigger alarm indicating an original cause of an abnormality to an operator by an operation monitoring terminal when the trigger alarm is included in an alarm that is received or generated;
storing a suppressed alarm indicating a secondary process abnormality due to the process abnormality that caused the trigger alarm, without presenting the suppressed alarm to the operator, when the suppressed alarm is included in the alarm;
additionally presenting the stored suppressed alarm to the operator based on an operation by the operator to the operation monitoring terminal;
determining whether the suppressed alarm is effective for resolving the trigger alarm based on an operation history of a recovery operation by the operator or a response by the operator in a dialog box inquiring whether a particular suppressed alarm is effective for resolving the trigger alarm; and
when the suppressed alarm is determined as effective for resolving the trigger alarm, changing a control logic so that even when the suppressed alarm is included in the alarm, the suppressed alarm is subsequently presented to the operator together with the trigger alarm without the operator performing an operation to the operation monitoring terminal.

9. The alarm management method of claim 8, wherein when the suppressed alarm is effective for resolving the trigger alarm, the suppressed alarm is presented to the operator with greater emphasis than other suppressed alarms that are stored in the storage.

10. The alarm management method of claim 8, further comprising optimizing, by a learning unit, a classification condition for classifying the alarm as the trigger alarm or the suppressed alarm based on the operation history of the operator.

11. The alarm management method of claim 8, wherein the suppressed alarm is downstream of the trigger alarm.

12. The alarm management method of claim 8, wherein the suppressed alarm is determined as effective when a number of times the trigger alarm was resolved by the suppressed alarm is greater than a threshold value.

13. The alarm management method of claim 8, wherein the suppressed alarm is determined as effective based on an input from the operator to the dialog box indicating that the suppressed alarm is effective.

14. An alarm management apparatus comprising:
a storage; and
a processor configured to at least:
receive information on one or more process abnormalities;
generate, based on the information, a trigger alarm and a plurality of secondary alarms that are related to the trigger alarm and are downstream of the trigger alarm;
present the trigger alarm indicating an original cause of an abnormality to an operator by an operation monitoring terminal when the trigger alarm is included in an alarm that is received or generated;
store, in the storage, one or more suppressed alarms among the plurality of secondary alarms that indicates a secondary process abnormality due to the process abnormality that caused the trigger alarm, without presenting the one or more suppressed alarms to the operator, when the one or more suppressed alarms is included in the alarm;
additionally present the stored suppressed alarm to the operator based on an operation by the operator to the operation monitoring terminal;
determine whether the one or more suppressed alarms is effective for resolving the trigger alarm based on an operation history of a recovery operation by the operator or a response by the operator in a dialog box inquiring whether a particular suppressed alarm is effective for resolving the trigger alarm; and
when the one or more suppressed alarms was determined as effective for resolving the trigger alarm, change a control logic so that even when the one or more suppressed alarms is included in the alarm, the one or more suppressed alarms is subsequently presented to the operator together with the trigger alarm without the operator performing an operation to the operation monitoring terminal.

15. The alarm management apparatus of claim 14, wherein when the one or more suppressed alarms is effective for resolving the trigger alarm, the alarm management apparatus is configured to present the one or more suppressed alarms to the operator with greater emphasis than other suppressed alarms that are stored in the storage.

16. The alarm management apparatus of claim 14, further comprising a learning unit, implemented by one or more processors, configured to optimize a classification condition for classifying the alarm as the trigger alarm or the suppressed alarm based on the operation history of the operator.

17. The alarm management apparatus of claim 14, wherein the alarm management apparatus is communicatively connected to a control bus, and wherein the operation monitoring terminal and an engineering terminal are communicatively connected to the control bus.

18. The alarm management apparatus of claim 14, wherein the suppressed alarm is downstream of the trigger alarm.

19. The alarm management apparatus of claim 14, wherein the one or more suppressed alarms is determined as effective when a number of times the trigger alarm was resolved by the one or more suppressed alarms is greater than a threshold value.

20. The alarm management apparatus of claim 14, wherein the one or more suppressed alarms is determined as effective based on an input from the operator to the dialog box indicating that the one or more suppressed alarms is effective.

* * * * *